United States Patent [19]
Simpson

[11] Patent Number: 5,739,870
[45] Date of Patent: Apr. 14, 1998

[54] MATH ENGINE FOR GENERATING FONT GRADIENTS

[75] Inventor: Ron C. Simpson, Erie, Colo.

[73] Assignee: Display Laboratories, Inc., Boulder, Colo.

[21] Appl. No.: 613,902

[22] Filed: Mar. 11, 1996

[51] Int. Cl.$^6$ .................................................. H04N 17/00
[52] U.S. Cl. ........................... 348/628; 348/190; 348/806
[58] Field of Search ................................. 348/625, 628, 348/671, 615, 177, 184, 190, 191, 806, 807, 629; 345/147, 149, 89, 254; 382/267, 268; 315/368.12, 368.13; H04N 5/208, 5/57, 17/00

[56] References Cited

U.S. PATENT DOCUMENTS

| | | | |
|---|---|---|---|
| 3,852,640 | 12/1974 | McCarthy | 315/276 |
| 3,943,279 | 3/1976 | Austefjord | 315/368.12 |
| 3,995,269 | 11/1976 | Schumacher | 315/377 |
| 4,027,148 | 5/1977 | Rosenthal | 235/198 |
| 4,058,826 | 11/1977 | Schneider | 358/10 |
| 4,401,922 | 8/1983 | Kamata et al. | 315/368 |
| 4,422,019 | 12/1983 | Meyer | 315/368 |
| 4,506,292 | 3/1985 | Newton et al. | 358/34 |
| 4,523,188 | 6/1985 | Huber | 340/734 |
| 4,531,160 | 7/1985 | Ehn | 345/147 |

(List continued on next page.)

FOREIGN PATENT DOCUMENTS

| | | | |
|---|---|---|---|
| 0404700 | 12/1990 | European Pat. Off. | H04N 17/04 |
| 0448267 | 9/1991 | European Pat. Off. | H04N 17/04 |
| 0257096 | 11/1986 | Japan | A04N 17/04 |
| 2 073 996 | 10/1981 | United Kingdom | H04N 3/22 |
| 2073996A | 10/1981 | United Kingdom | H04N 3/22 |

OTHER PUBLICATIONS

James R. Webb; Micro–Chip Architecture for Full Digital Control of Geometry, Convergence and Colorimetry in CRT Monitors, Jun. 1994.

Charles Chuang et al; A Non–impact High Geometry Alignment System for Monitor Production. Paper given at Society for Information Display, San Jose, California, Jun. 1994.
Society for Information Display International Symposium, Digest of Technical Papers, vol. XXV, Jun. 14–16, 1994.
CRT Display Inspection with a Solid State Camera, by Gregory A. Kern. Paper given at Society for Information Display, San Jose, California, Jun. 1994.
Firmware for a Continuous Frequency CRT Monitor, by Steven J. Lassman. Paper given at Society for Information Display, San Jose, California, Jun. 1994.
Society for Information Display, Digest of Technical Papers, Feb. 6–8, 1996.

(List continued on next page.)

*Primary Examiner*—John K. Peng
*Assistant Examiner*—Jeffrey S. Murrell
*Attorney, Agent, or Firm*—William W. Cochran, II; Holland & Hart LLP

[57] ABSTRACT

A interpolation engine is disclosed that is capable of generating correction signals for segments of a monitor that form a gradient that eliminates any visual discontinuities between segments on the screen. In one embodiment, a starting count number for a distortion signal is stored in RAM, together with an increment rate signal that indicates the rate of change of the correction signal down the segment. In another embodiment, the increment rate signal is automatically calculated by the device by taking the difference between the starting count numbers for vertically adjacent segments. Since the number of rows in each segment is known and the difference between the starting count numbers of vertically adjacent segments is determined, the amount of correction for each row within a segment is calculated and provided as a correction signal. Hence, a correction signal can be provided for each row of pixels on a screen. This information can be integrated to form a smooth correction signal or need not be integrated for vertical geometry corrections since a correction signal is provided for each row. The present invention only requires a minimal amount of storage of data and is capable of providing correction signals for each row of pixels.

4 Claims, 9 Drawing Sheets

U.S. PATENT DOCUMENTS

| | | | |
|---|---|---|---|
| 4,649,506 | 3/1987 | Van den Heuvel | 364/607 |
| 4,654,706 | 3/1987 | Davidson et al. | 358/139 |
| 4,672,275 | 6/1987 | Ando | 315/368 |
| 4,673,847 | 6/1987 | Louie et al. | 315/368 |
| 4,680,510 | 7/1987 | Spieth et al. | 315/368 |
| 4,687,973 | 8/1987 | Holmes et al. | 315/371 |
| 4,689,526 | 8/1987 | Schweer | 315/371 |
| 4,757,239 | 7/1988 | Starkey | 315/371 |
| 4,771,334 | 9/1988 | Bolger | 358/242 |
| 4,772,948 | 9/1988 | Irvin | 358/139 |
| 4,816,908 | 3/1989 | Colineau et al. | 358/60 |
| 4,817,038 | 3/1989 | Knoll et al. | 364/413.24 |
| 4,843,284 | 6/1989 | Schmitt et al. | 315/371 |
| 4,857,998 | 8/1989 | Tsujihara et al. | 348/190 |
| 4,871,948 | 10/1989 | Nelson | 315/368 |
| 4,897,721 | 1/1990 | Young et al. | 358/139 |
| 4,952,851 | 8/1990 | Macaulay | 315/398 |
| 4,977,355 | 12/1990 | Rodriguez-Cavazos et al. | 315/368.13 |
| 5,012,332 | 4/1991 | Shiomi et al. | 358/64 |
| 5,016,095 | 5/1991 | Kii | 358/64 |
| 5,020,116 | 5/1991 | Macaulay | 358/60 |
| 5,059,979 | 10/1991 | Micic et al. | 341/152 |
| 5,081,523 | 1/1992 | Frazier | 358/29 |
| 5,091,773 | 2/1992 | Fouche et al. | 358/10 |
| 5,136,398 | 8/1992 | Rodriguez-Cavazos et al. | 358/242 |
| 5,194,783 | 3/1993 | Ogino et al. | 315/368.13 |
| 5,200,815 | 4/1993 | Tsujihara et al. | 358/60 |
| 5,216,497 | 6/1993 | Tsujihara et al. | 358/65 |
| 5,216,504 | 6/1993 | Webb et al. | 358/139 |
| 5,272,421 | 12/1993 | Kimura et al. | 315/368.12 |
| 5,274,307 | 12/1993 | Christensen | 315/368.13 |
| 5,276,458 | 1/1994 | Sawdon | 345/132 |
| 5,345,280 | 9/1994 | Kimura et al. | 348/745 |
| 5,379,062 | 1/1995 | Gleim et al. | 348/184 |
| 5,382,984 | 1/1995 | Tsujihara et al. | 346/746 |
| 5,398,083 | 3/1995 | Tsujihara et al. | 346/746 |
| 5,414,330 | 5/1995 | Tjujihara et al. | 315/371 |
| 5,430,357 | 7/1995 | Ogino et al. | 315/368.13 |
| 5,432,548 | 6/1995 | Byen et al. | 348/180 |
| 5,440,340 | 8/1995 | Tsurutani et al. | 348/190 |
| 5,444,799 | 8/1995 | Hirono et al. | 382/287 |
| 5,463,427 | 10/1995 | Kawashima | 315/368.13 |
| 5,473,223 | 12/1995 | Murakami | 315/367 |
| 5,473,224 | 12/1995 | Tsujihara et al. | 315/368.18 |
| 5,504,521 | 4/1996 | Webb et al. | 348/180 |
| 5,506,481 | 4/1996 | Wada et al. | 315/368.13 |
| 5,510,833 | 4/1996 | Webb et al. | 358/139 |
| 5,510,851 | 4/1996 | Foley et al. | 348/658 |
| 5,532,765 | 7/1996 | Inoue et al. | 348/807 |
| 5,537,159 | 7/1996 | Suematsu et al. | 348/745 |

OTHER PUBLICATIONS

IEEE 1988 International Conference on consumer Electronics, Jun. 8–10, 1988.

W. Press, S. Teukolsky, W. Vetterling and B. Flannery, Numerical Recipes in C –the Art of Scientific Computing at 123–128 (2nd ed. 1988).

SGS Thompson Catalog of Components for Multisync Monitors.

Display Laboratories, Inc., Minicam Automated Monitor Alignment & Inspection System, 1994.

Display Laboratories, Inc., DLAB43A, Advanced Information, 1995.

Display Laboratories, Inc., DLAB62A, Advanced Information, 1995.

Display Laboratories, Inc., DLAB494, Advanced Information, 1995.

Display Laboratories, Inc., DLAB520A, Advanced Information, 1995.

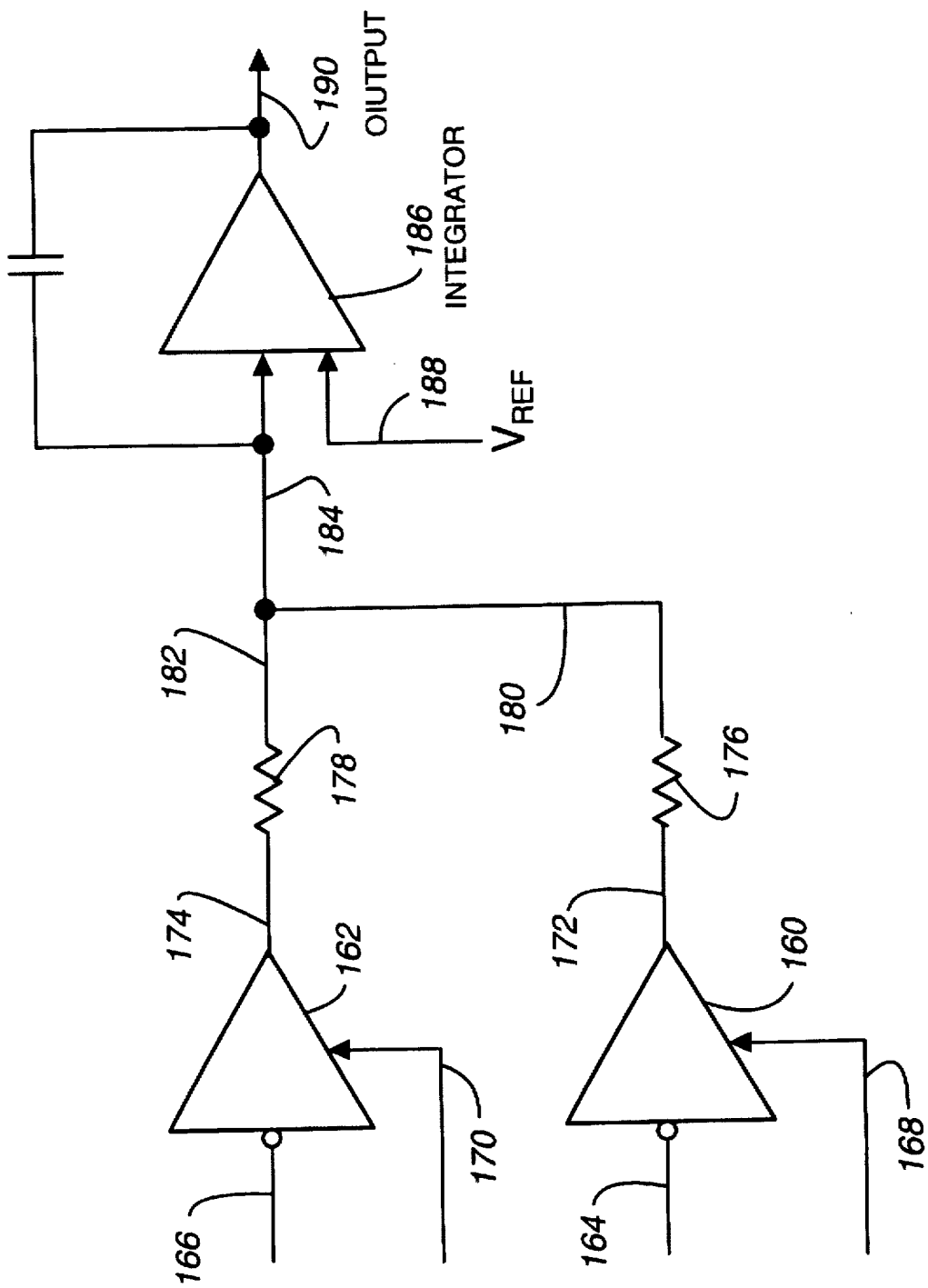

```
              0123456789ABCDEF
D₀    0001   ●●●●●●●○●●●●●●●●
D₁    0010   ●●●●○●●●●●●●○●●●
D₂    0100   ●●○●●●○●●●○●●●○●
D₃    1000   ●○●○●○●○●○●○●○●○
0     0000   ●●●●●●●●●●●●●●●●
```

*Fig. 8*

MATH ENGINE FOR GENERATING FONT GRADIENTS

BACKGROUND OF THE INVENTION

A. Field of Invention

The present invention pertains generally to cathode-ray tube alignment systems and more particularly to methods in apparatus for generating horizontal rate correction signals.

B. Description of the Background

Various methods have been used for generating both vertical and horizontal rate correction signals such as disclosed in U.S. Pat. No. 5,216,504 entitled: "Automatic Precision Video Monitor Alignment System" issued to James R. Webb, et al. on Jun. 1, 1993, U.S. patent application Ser. No. 08/258,393 filed Jun. 13, 1994 now U.S. Pat. No. 5,504,521 issued Apr. 2, 1996 by James R. Webb, et al. entitled "Method and Apparatus for Making Corrections in a Video Monitor During Horizontal Scan," U.S. patent application Ser. No. 08/585,926 filed on Jan. 16, 1996 by James R. Webb, et al. entitled "Method and Apparatus for Making Corrections in a Video Monitor During Horizontal Scan" (which is a continuation of the above identified application) and U.S. patent application Ser. No. 08/611,098 filed Mar. 5, 1996 by James R. Webb, et al. entitled "Method and Apparatus for Making Corrections in a Video Monitor" (which is a continuation-in-part of tile above identified application), all of which are specifically incorporated herein by reference for all that they disclose and teach.

Video monitors such as for use with digital computers or televisions, typically include a cathode-ray tube (CAT) and driver circuitry including video, horizontal and vertical amplifiers. Early versions of video monitors included a variety of potentiometers which were adjusted at the factory to align and adjust the display presented on the CAT. Also, a few pots were accessible on the exterior of the monitor for adjustment by the user. External pots commonly included controls for brightness, contrast and possibly horizontal and vertical size and center position.

More modern monitors often include a relatively larger number of adjustable parameters which can be used to provide a more precisely aligned and color balanced display. Some of the modern monitors include digital control circuits for storing values of these adjustable parameters and for controlling the driver circuitry of the monitor in accordance with the stored values.

U.S. Pat. No. 5,216,504, cited above, discloses an alignment system including a pick-up camera located adjacent to the CRT of the monitor for capturing an image of the display and communicating the image to a computer. The computer communicates with a microprocessor and digital control circuit within the monitor that control the video driver circuitry of the monitor. The system operates in a manner to automatically and optimally adjust the alignment and color balance of the display for the particular video signal that is applied to the monitor and for the particular settings of the external controls and monitors.

In order to accurately adjust the alignment for both horizontal and vertical geometries, as well as providing correction signals for other control factors of the monitor, it is desirable to make adjustments while the vertical and horizontal scan of the CRT is taking place. Vertical geometry display parameters, such as pin-cushioning, horizontal width, vertical convergence, vertical luminocity, etc., are corrected by a voltage waveform generator that develops a pulse-width modulated (PWM) signal for correcting such display parameters. As disclosed in U.S. Pat. No. 5,216,504, the width of the PWM signal corresponds to the magnitude of the target value for correcting the display parameter. The pulse-width can be changed for different vertical segments of the video raster to produce the desired target value. Rather than provide a separate PWM signal for each horizontal line in the vertical scan, which would require storage of a very large amount of correction data, the lines are grouped into a predetermined number of vertical segments. For example, the screen of the monitor may be divided into 16 different vertical segments with each segment requiring its own correction signal. A separate PWM correction signal is provided for each segment, with each PWM signal representing the rate of change of the display parameter during a given segment. This rate of change signal is analogous to the time derivative of the desired correction waveform, as disclosed in U.S. patent application Ser. No. 08/611,097 filed on Mar. 5, 1996 by James R. Webb, Steven L. Lassman and Ron C. Simpson entitled "Method and Apparatus for Making Corrections to a Video Monitor" (which is a continuation- in-part application of the above identified applications. As disclosed in the above-identified application, the time derivative signal is integrated once to form a smooth correction signal.

Similar corrections are also made in the horizontal scan direction to correct display parameters, such as convergence, luminosity, etc. For example, U.S. patent application Ser. No. 08/258,393 filed on Jun. 13, 1994 by James R. Webb, Steven L. Lassman and Ron C. Simpson entitled "Method and Apparatus for Making Corrections in a Video Monitor During Horizontal Scan" and U.S. patent application Ser. No. 08/585,926 filed Jan. 16, 1996 by James R. Webb, Steven L. Lassman and Ron C. Simpson entitled "Method and Apparatus for Making Corrections in a Video Monitor" both disclose the use of an on-screen display chip for generating pulse density modulation signals that are capable of making horizontal scan corrections.

The use of on-screen display chips that are modified to store fonts that have the proper pulse density gradient is a convenient tool for producing the proper corrections in a smooth manner as the electron gun moves down the page, as disclosed in the above-identified applications. As disclosed in the above-identified applications, one of the benefits of using the on-screen display chip is that it is a readily available part that is inexpensive and easy to implement. However, because of the wide variety of different gradients that need to be generated, it is sometimes difficult to obtain an on-screen display chip with the desired fonts stored in read-only-memory (ROM), or to obtain an on-screen display chip with the desired amount of random access memory (RAM) so that the user can generate the desired gradients. Custom modifications of the on-screen display chip to provide more RAM, or to custom design the on-screen display chip to provide the desired fonts, may defeat the cost advantages and ease of use associated with such on-screen chips.

It is therefore desirable to generate gradients in an inexpensive and easy manner to produce the desired horizontal and vertical correction signals so that noticeable changes in the correction do not appear on the screen as the electron beam moves down the page, but rather, a smooth blending of corrections is generated.

It is against this background, and the limitations and problems associated therewith, that the present invention has been developed.

SUMMARY OF THE INVENTION

The present invention overcomes the disadvantages and limitations of the prior art by providing a interpolation engine that is capable of generating gradient signals on a real time basis so that a pulse density modulated signal can be generated that has a pulse-density gradient that varies at the proper rate as the electron beam moves down the page.

The present invention, therefore, comprises a method for generating a gradient of pulse-density modulated correction signals for a video monitor that comprises the steps of, loading a gradient counter with a starting count number for the gradient to be generated, loading an increment rate counter with an increment rate number, generating an increment signal from the increment rate counter that has an increment rate corresponding to the increment rate number, and generating the gradient of pulse density modulated correction signals from the gradient counter by applying the increment signal to the gradient counter to increment the starting count number at the increment rate so as to produce a series of output signals having a gradient that changes at a rate corresponding to the increment rate number.

The present invention also comprises a method of generating a plurality of pulse density modulation signals for a first predetermined vertical segment of a video monitor comprising the steps of generating a first start count number for a first predetermined vertical segment that is representative of a first predetermined number of pulses in a first horizontal line of the first predetermined vertical segment, generating a second start count number for a second predetermined vertical segment located vertically adjacent to the first vertical segment, the second start count number representative of a second predetermined number of pulses in a first horizontal line of the second predetermined vertical segment, generating a difference signal that is representative of a difference between the first and second predetermined number of pulses, generating a gradient signal that is representative of a rate of change of the predetermined number of pulses for each horizontal line of the first predetermined vertical segment, and generating the plurality of pulse density modulation signals for the first vertical segment by modifying the first starting count number by the gradient signal to determine the predetermined number of pulses for each horizontal line of the first vertical segment.

The advantages of the present invention are that the plurality of pulse density modulated signals that form a gradient in the vertical direction along the screen are generated using a interpolation engine that is inexpensive and easy to implement. The present invention additionally only requires a small amount of storage. In one embodiment, only the starting count numbers and increment rate numbers are required to be stored to produce the gradient of pulse density modulation signals. In a second embodiment, only the starting count numbers are required to be stored and the increment rate signal is generated by determining the difference between the starting count numbers for adjacent vertical segments. The minimal storage requirements of the present invention result in significant cost savings to produce the plurality of pulse density modulation signals.

Additionally, since corrections are produced for each horizontal line, the filtering, and/or integration requirements for smoothing corrections for vertical geometries between lines may be eliminated, thereby further reducing the requirements of the correction signal circuitry.

Additional advantages and novel features of the invention are set forth in part in the description which follows and can be understood by those skilled in the art upon examination of the following or may be learned by practice of the invention. The advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings, wherein:

FIG. 6 is a schematic block diagram illustrating the manner in which an integrator is coupled to the output of the embodiment of FIGS. 5A and 5B.

FIG. 8 is a schematic representation of the bits generated by the implementation of the look-up table of FIG. 7.

DETAILED DESCRIPTION OF THE PREFERRED EMBODIMENT OF THE INVENTION

Figure 1:
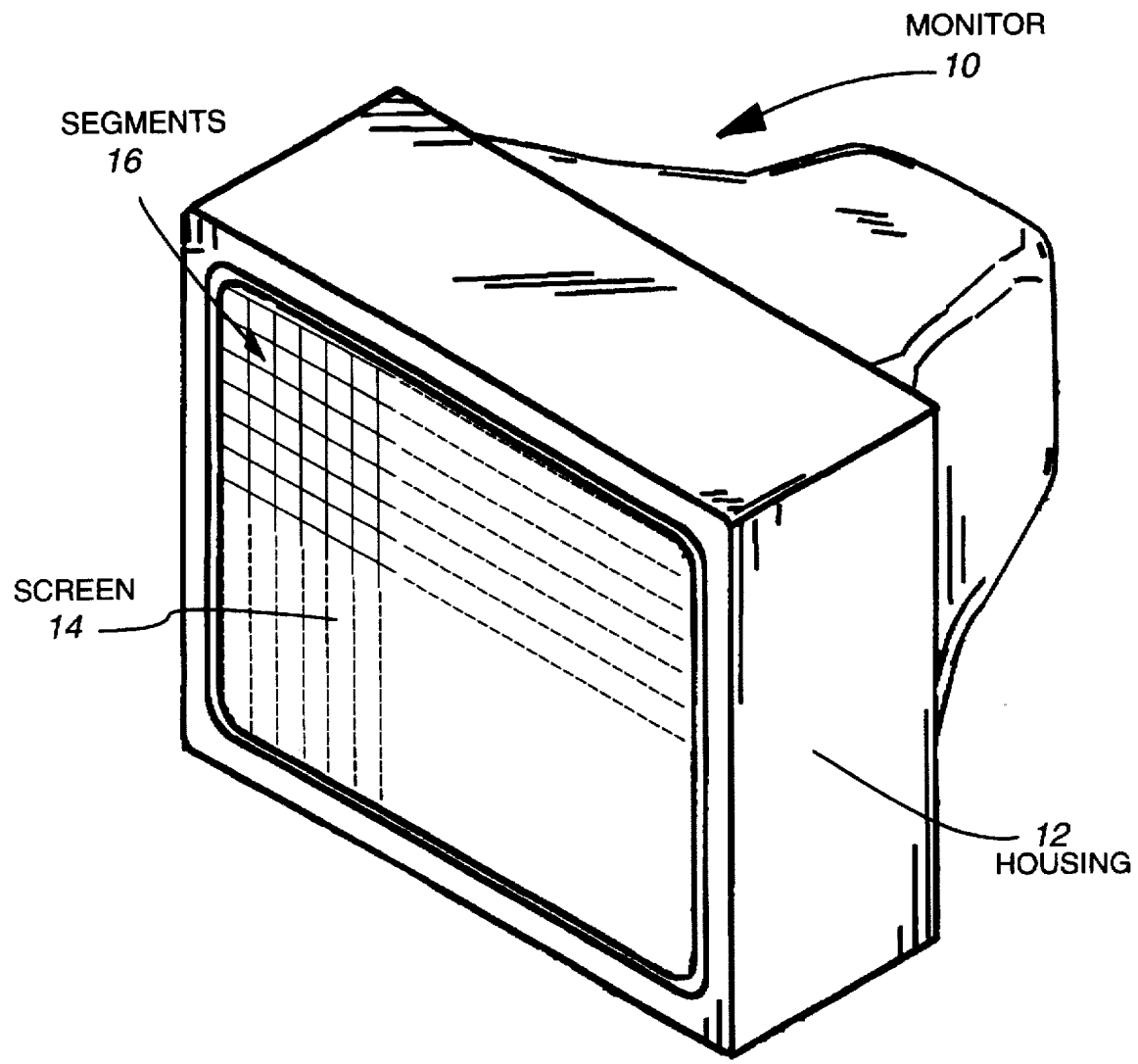
FIG. 1 is a schematic illustration of a monitor.

FIG. 1 is a schematic illustration of a monitor 10 having a housing 12 and a screen 14 mounted within the housing. The screen 14 is divided into a plurality of segments 16 that form columns and rows on the face of the screen 14. The segments 16 are only schematically illustrated in FIG. 1, and do not actually appear on the face of the screen 14. The segments shown on the screen merely represent locations that are mapped to a memory for the purpose of generating correction signals. The locations are identified by pixel row number and pixel column number. For a standard VGA monitor, for example, there are 480 rows and 640 columns of pixels. If the screen is divided into 16 columns and 16 rows (256 segments) 30 rows and 40 columns of pixels will be included in each segment 16. Each of the segments 16 identifies a region on the screen for the generation of correction signals.

Figure 2:
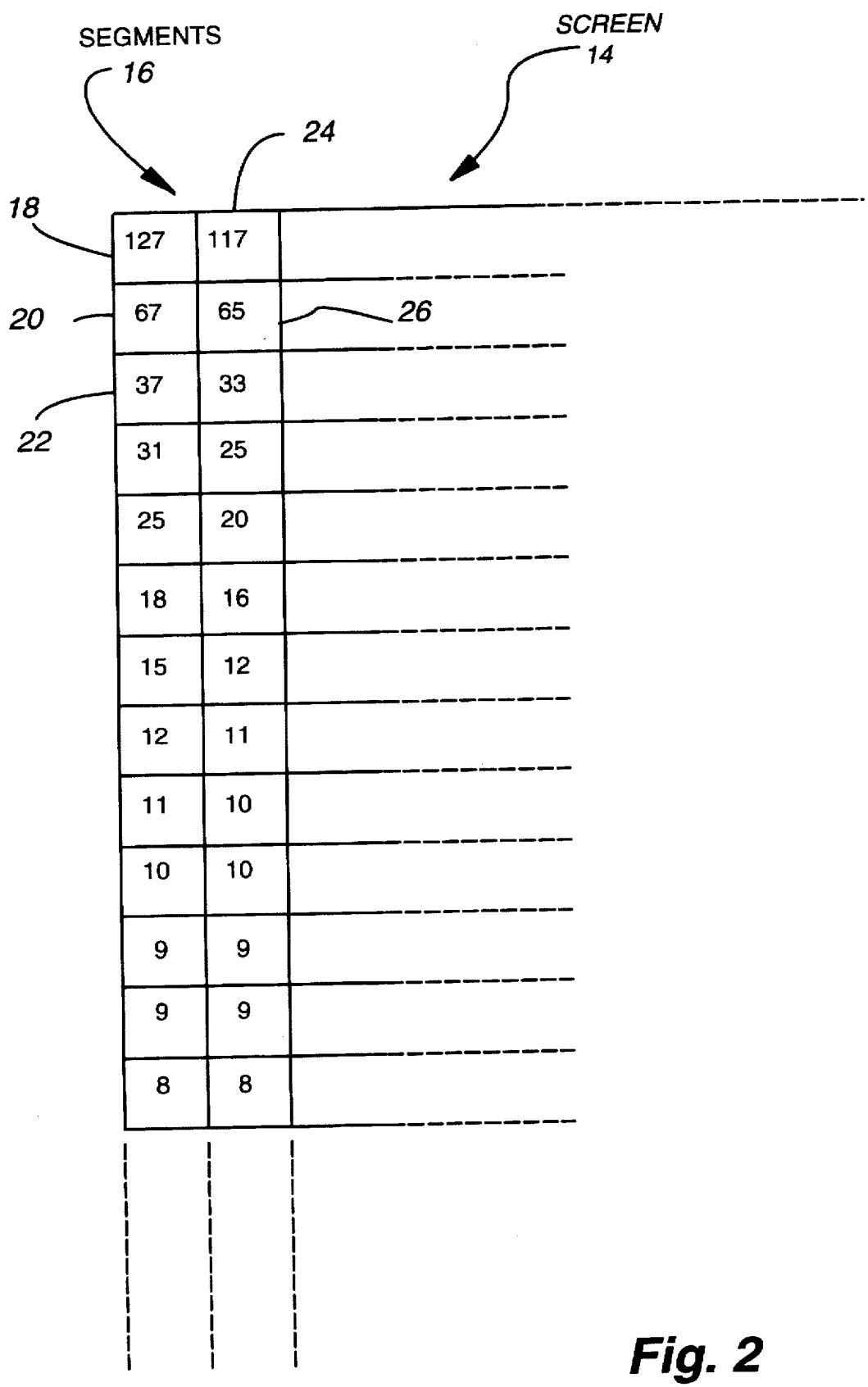
FIG. 2 is a schematic illustration of a monitor screen that is divided up into a plurality of segments.

FIG. 2 is a schematic illustration of a plurality of segments 16 on screen 14. FIG. 2 illustrates a plurality of segments 16 that each have a starting count number that corresponds to the correction number for the first line of the segment. For example, segment 18 has a starting count number of 127, while segment 20 has a starting count number of 67 and segment 22 has a starting count number of 37. Similarly, segment 24 has a starting count number of 117. Each of these starting count numbers is representative of the magnitude of correction (the correction number) that is required in the first horizontal row of that segment for a particular correction parameter. In this example, the amount of correction can range from −127 to +127. So, segment 18 requires a maximum amount of correction in its first row. These correction numbers can be representative of the required correction for any one of a number of correction factor parameters, such as convergence, luminosity, etc. The number of correction numbers in each line of each segment 18 is representative of the number of pulses that are to be generated to produce a pulse-density-modulated signal, as disclosed in the above-identified application, Ser. No. 08/258,393 filed in Jun. 13, 1994, and the above-referenced continuation and continuation-in-part applications, cited above. Alternatively, the correction numbers can be used to generate pulse-width modulation signals, as referred to in the above-cited patent applications and in U.S. Pat. No. 5,216,504. Pulse-width modulation signals can be used to make vertical geometry corrections, such as corrections to pin-cushioning, vertical linearity, etc.

As also shown in FIG. 2, while the correction factor for the first line of segment 18 is 127, the correction factor for the first line in segment 20 is only 67. Although there are a large number of segments 16 on screen 14, e.g. 256 segments, if the same correction number is used for an entire segment and there is a large difference between the starting count numbers of adjacent segments, a noticeable disparity may be visible on the screen 14. For example, the difference between the starting count numbers for segment 18 and segment 20 is 60. This is a substantially large difference so that if the starting count number 127 is used for the entire segment 18, and then the starting count number 67 is used for segment 20, a visible disparity may appear on screen 14. It is, therefore, desirable to generate a gradient of correction numbers vertically down segment 18 so that segment 18 blends well and matches with the starting count number 67 of segment 20. This applies in a similar fashion to other vertically adjacent segments, such as segment 20 and segment 22, and segment 24 and segment 26.

Figure 3:
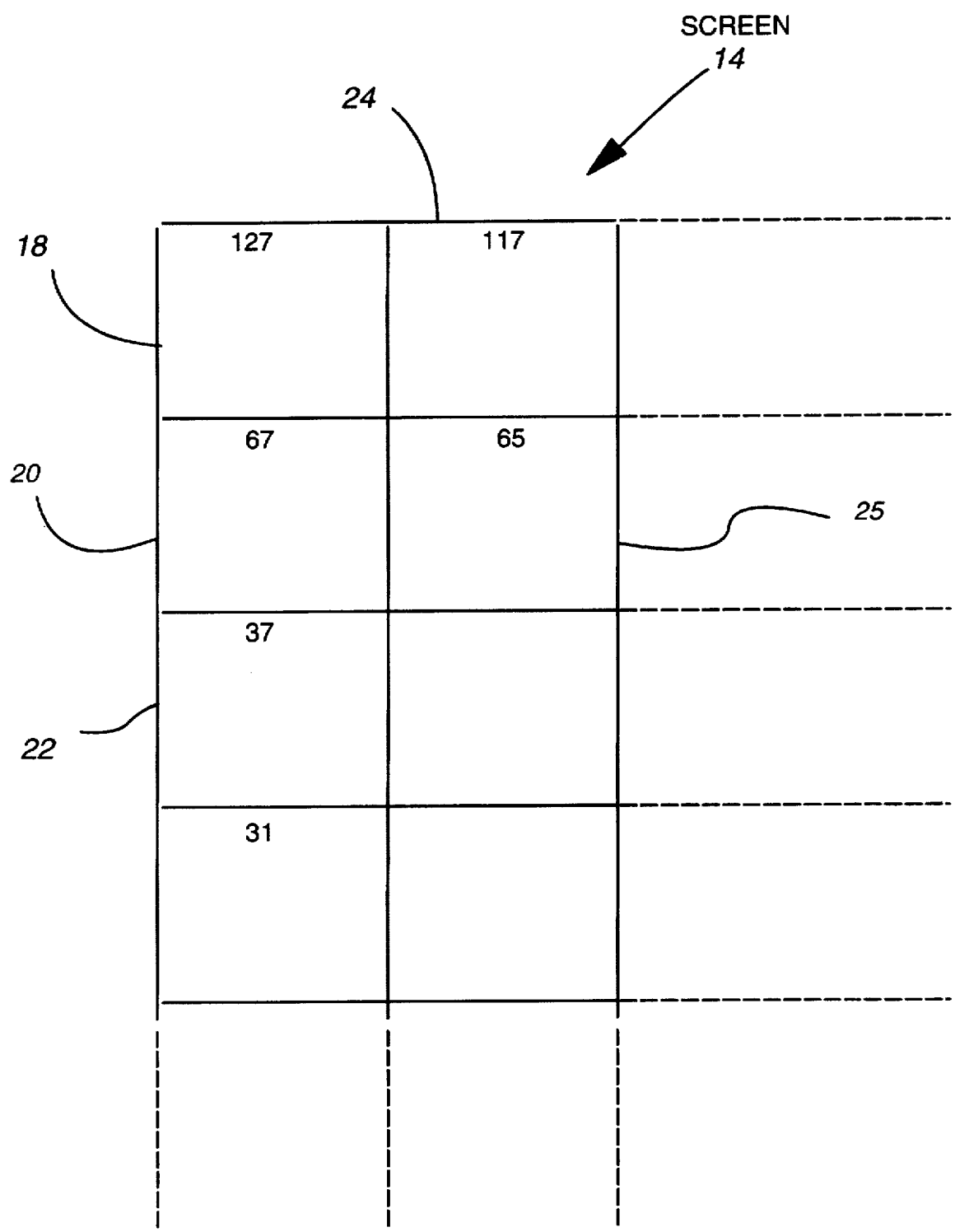
FIG. 3 is a schematic illustration of a monitor screen showing starting count numbers for several adjacent segments.

FIG. 3 further illustrates the various segments 18 through 24. As shown in FIG. 3, the difference between the starting count number of segment 18 and the starting count number of segment 20 is a delta of 60. If there are 30 rows in each of the segments 16, the increment rate can be calculated as follows:

increment rate=delta/(number of lines)=60/30=2

To generate a gradient vertically down segment 18 to match segment 20, each line of segment 18 must be incremented by a factor of 2. Hence, the second line of segment 18 would have a correction factor of 125, the third line would have a correction factor of 123, the fourth line would have a correction factor of 121, and so on. In a similar fashion, the increment rate for segment 20 is as follows:

increment rate=delta/(number of lines)=30/30=1

Hence, each horizontal row of segment 20 would be incremented by one number, so that for the second line, the correction factor would be 66, for the third line, the correction factor would be 65, and so on.

For segment 22, the increment rate is calculated in the same manner:

Increment rate=delta/(number of lines)=6/30=1/5

Hence, every fifth row of segment 22 would be incremented by one correction factor number. The first five rows of segment 22 would have a correction factor of 37, rows 6–10 of segment 22 would have a correction factor of 36, rows 11–15 would have a correction factor of 35, and so on.

Figure 4:
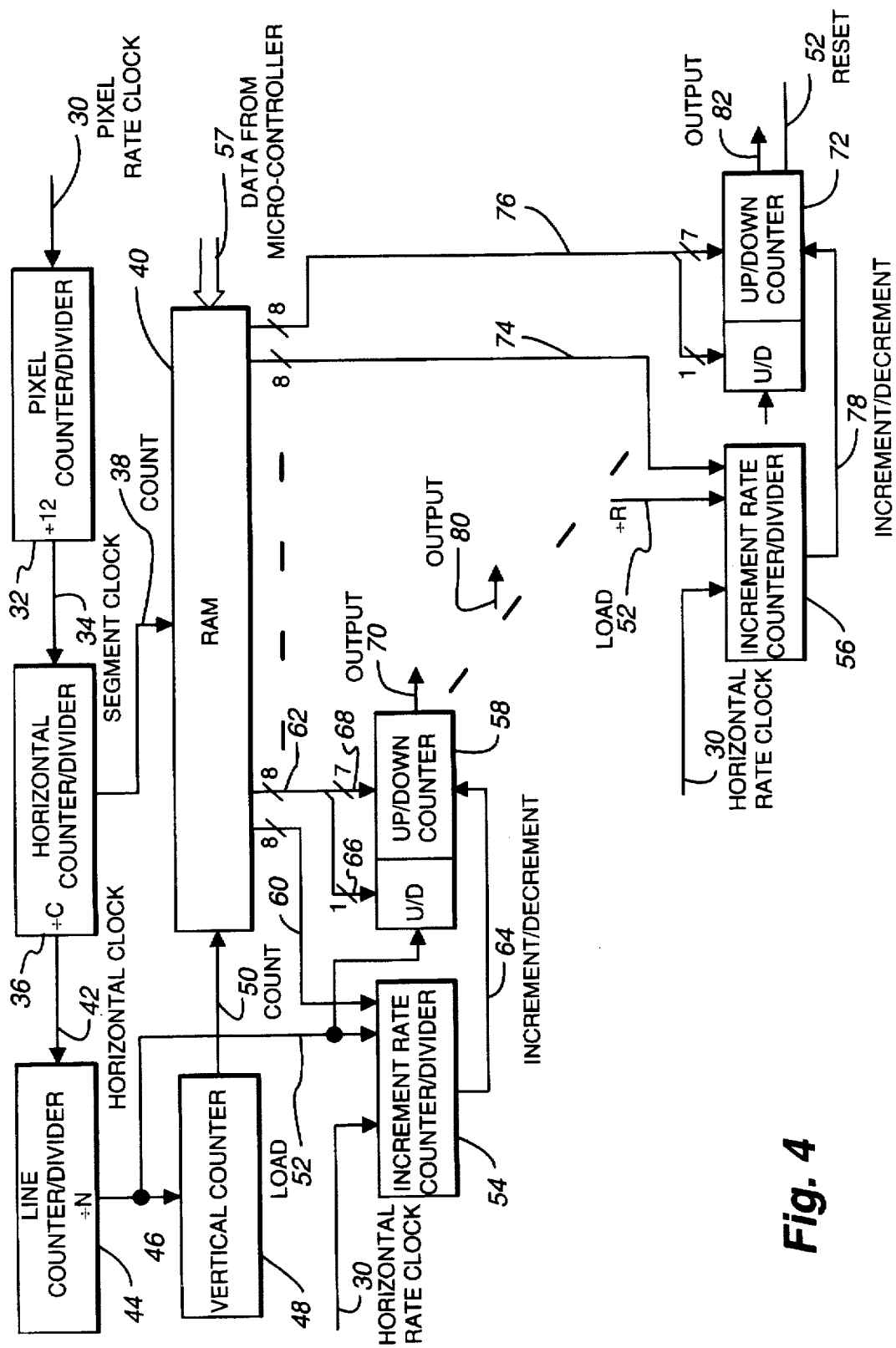
FIG. 4 is a schematic block diagram of one embodiment for generating a gradient of correction signals.

FIG. 4 is a schematic block diagram of an embodiment for generating a gradient of correction signals. The RAM 40 of FIG. 4 stores a series of starting count numbers for each gradient to be generated. As shown in FIG. 4, a separate up/down counter is provided for each segment that is desired to be generated across the entire width of the screen. RAM 40 also stores an increment rate number with the starting count number. The increment rate number indicates how fast an increment rate counter/divider, associated with each up/down counter, should increment or decrement an associated up/down counter.

As shown in FIG. 4 the pixel rate clock 30 is applied to a pixel counter/divider 32 that divides the pixel rate clock by the number of pixels in each horizontal row that are provided across each segment. As illustrated in this embodiment, pixel counter/divider 32 divides the pixel rate clock 30 by 12, since 12 pixels exist (in this example) horizontally across each segment. The segment clock signal 34, which generates a pulse at the end of each line of each segment, is applied to horizontal counter/divider 36. Horizontal counter/divider 36 produces an accumulated count signal 38 that is indicative of the number of the segment column to be addressed in RAM 40. Horizontal counter/divider 36 also produces an output signal 42 that divides the input signal 34 by the number of columns of segments (c) in a row across the screen. Hence, horizontal clock 42 comprises a pulse which occurs at the end of each row of starting numbers stored in RAM 40.

As also shown in FIG. 4, line counter/divider 44 divides the input 42 by a number (N) that is representative of the number of rows in each segment. Hence, line counter/divider 44 produces a pulse at output 46 at the end of the last line for each row of segments. Vertical counter 48 accumulates the pulses from input 46 to provide an accumulated count address signal 50 indicative of the address of the row of segments being addressed in RAM 40. Output 46 is also used as a load signal 52 to load all of the increment rate counter/dividers 54, 56 and all of the up/down counters 58, 72. Hence, all of the increment rate counter/dividers and all of the up/down counters are loaded at the end of the last line each row of segments. RAM 40, as illustrated in FIG. 4, stores pairs of 8 bit bytes that are supplied from a microcontroller via communication port 57. The pairs of 8 bit bytes comprise starting numbers and increment rate numbers that are supplied to each of the increment rate counter/dividers and up-down counters.

In operation, increment rate counter/divider 54 accumulates the pixel rate clock signal 30 until it reaches the value of the 8 bit count supplied by RAM 40 output 70, output 80, and output 82, as well as other outputs (not shown), are generated for each pair of 8 bit bytes that are stored in each column across RAM 40.

Figure 5A:
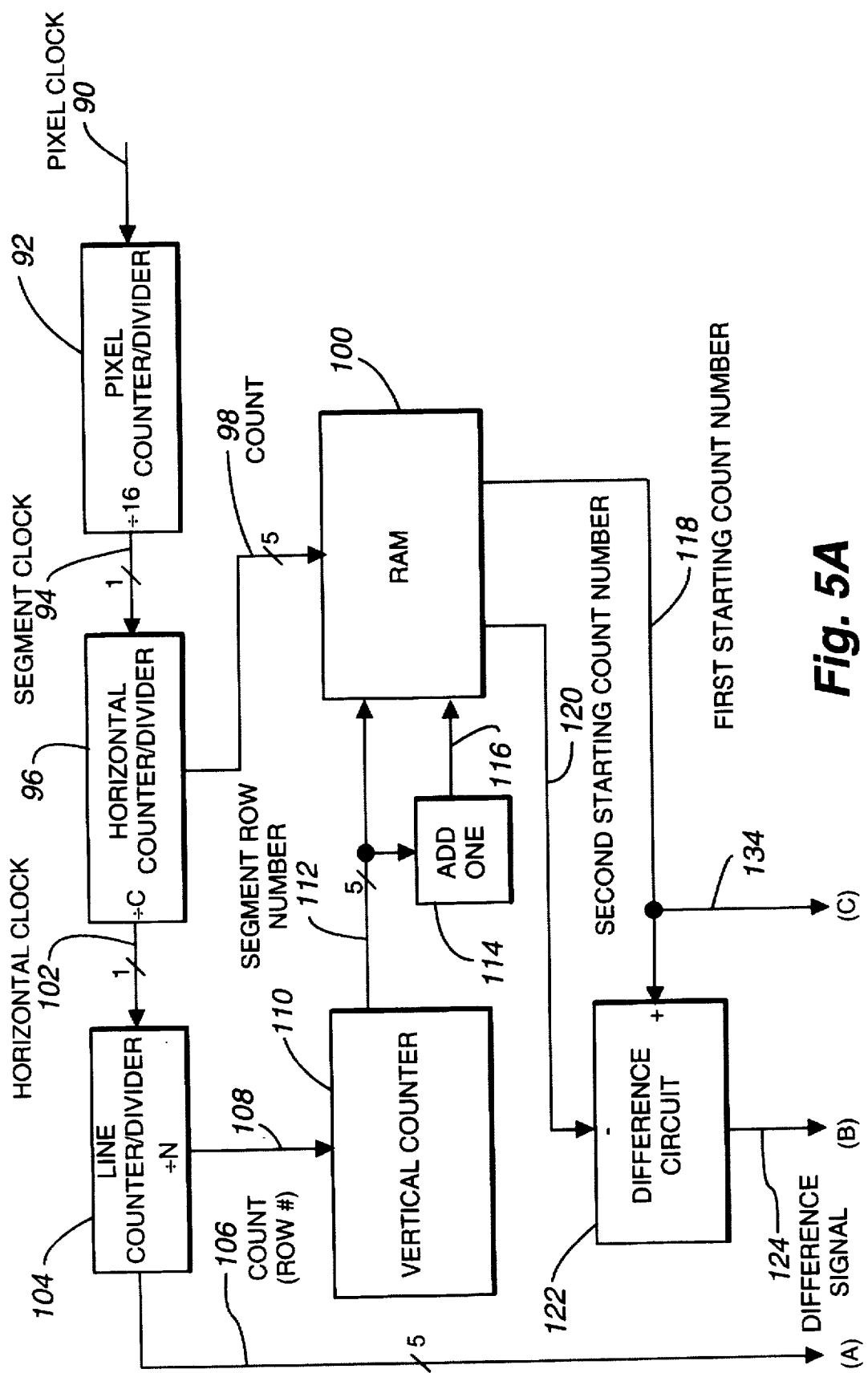
FIGS. 5A and 5B are schematic block diagrams of another embodiment for generating a gradient of correction signals.
Figure 5B:
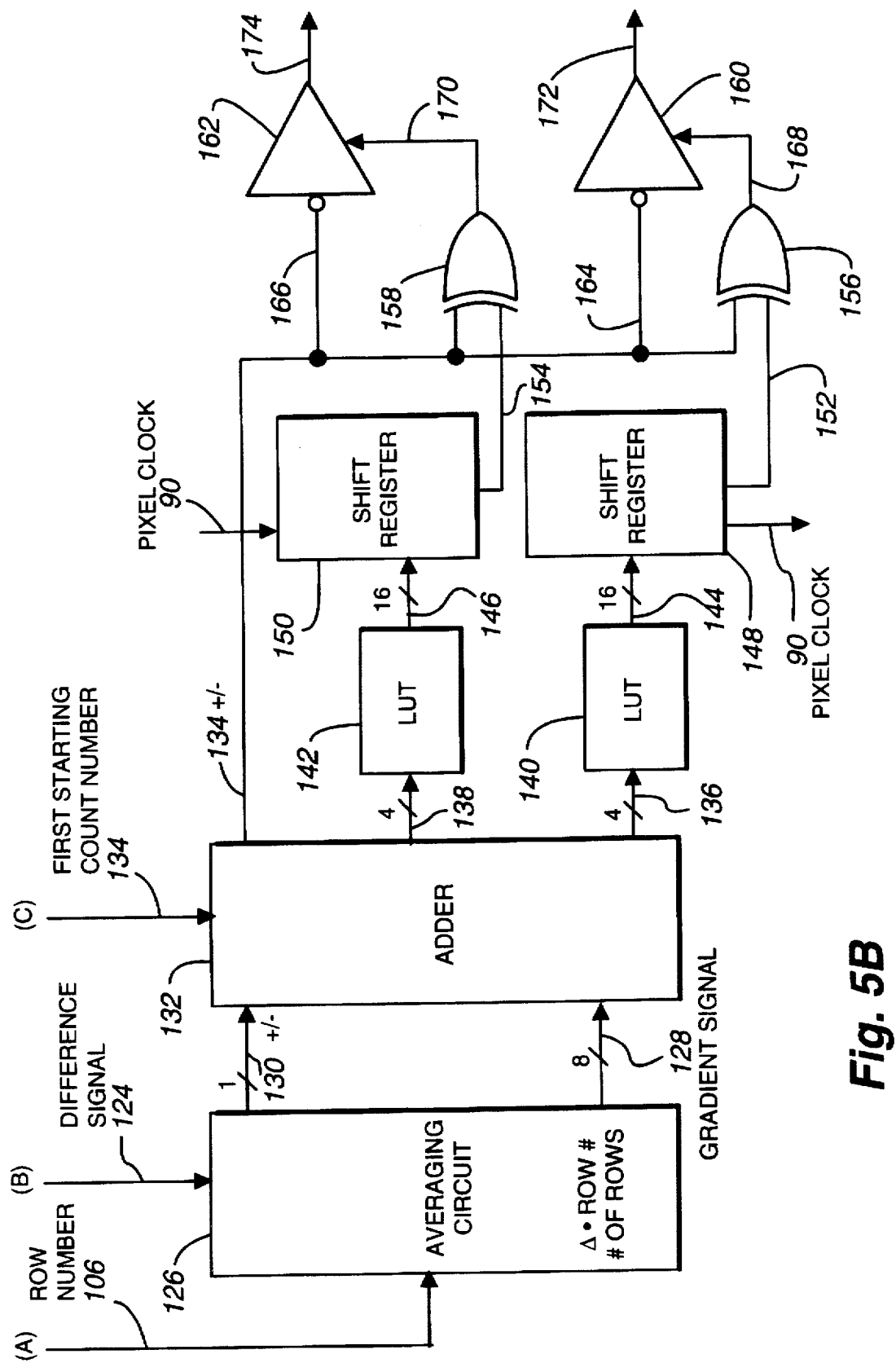

FIG. 5 is a schematic block diagram of another alternative embodiment for generating gradient correction signals. The embodiment of FIG. 5 is similar to the embodiment of FIG. 4, with the exception that the embodiment of FIG. 5 automatically calculates the increment rate based upon the difference between the starting count numbers of vertically adjacent segments, such as segments 18 and 20 (FIG. 2), rather than requiring the increment rate to be stored in RAM 40, such as disclosed in FIG. 4. As shown in FIG. 5, the pixel rate clock 90 is applied to pixel counter/divider 92 that divides the pixel clock 90 by the number of pixels in each column across a segment. Pixel counter/divider 92 divides the pixel clock 90 by 16 since, in this example, 16 pixels are present horizontally in each row across each segment. Hence, the output 94 of pixel counter/divider 92 is considered to be a segment clock since a pulse is generated on output 94 at the end of of each segment 16 on each row. The segment clock signal 94 is applied to horizontal counter/divider 96. Horizontal counter/divider 96 counts the number of segment clock signals 94 and produces a count signal 98 that is applied to RAM 100. Count signal 98 is an address signal indicating which column of segments 16 are being addressed in RAM 100. Horizontal counter/divider 96 also over connector 60. When the supplied count is reached, an increment/decrement carry signal 64 is produced and increment rate counter/divider 54 is reset. The increment/decrement signal 64 is applied to up-down counter 58. The 8 bit signal supplied by RAM 40 to up-down counter 58 via connector 62, has 1 bit 66 that indicates whether up-down counter 58 should count the input 64 as an increment or decrement signal, and 7 bits at input 68 that constitute the initial count signal that is being incremented or decremented by input 64. An output signal is therefore generated at output 70 that initially comprises the count loaded into up-down counter via input 68, and which is subsequently incremented or decremented at a rate determined by the increment rate number loaded into increment rate counter/divider 54 at input 60.

A separate increment rate counter/divider and up-down counter are provided for each pair of 8 bit bytes that are stored in RAM 40. For example, FIG. 4 also illustrates the last pair which comprise increment rate counter/divider 56 and up-down counter 72 that receive the count data stored in RAM 40 via connectors 74 and 76, respectively. Increment rate counter/divider 56 produces an increment/decrement signal 78 that is applied to up-down counter 72 in the same manner as described above. Each pair of increment rate counter/dividers and up-down counters are repeated for each column of segments across the screen 14 so that a series of outputs, including produces an output signal 102 that divides the segment clock signal 94 by the number of columns (C) that are stored in RAM 100. Hence, the horizontal clock 102 generates a pulse that occurs at the end of each full row across the width of the entire screen 14. Horizontal clock 102 is therefore analogous to the horizontal deflection signal that is generated in a monitor.

Line counter/divider 104 receives the horizontal clock signal 102 and accumulates the number of horizontal clock signals 102 to produce an output count signal 106. This output count signal 106 is representative of the row number within a particular segment. Line counter/divider 104 also generates an output signal 108 that divides the horizontal clock signal 102 by a number (N) that is representative of the number of rows in each segment 16. Hence, line counter/divider 104 produces a pulse on output 108 at the end of the last row for each row of segments 16. Output 108 also resets the counter of line counter/divider 104 so that the count on output 106 is representative of the row number within each segment 16.

Vertical counter 110 accumulates the pulses 108 to produce an output 112 which is representative of the vertical segment number. Segment count signal 112 is used to address the RAM 100 and provide a vertical segment number for the particular vertical segment that is being addressed. Adder 114 also receives the segment row number output 112 and adds one to the segment row number. The second address signal 116 that is produced by adder 114 addresses the segment row vertically beneath the segment row being addressed by address signal 112. Segment row address number 112 causes RAM 100 to generate an output 118 representative of a first starting count number. Segment row address number 116 causes RAM 100 to generate an output 120 representative of a second starting count number, i.e., a starting count number for a segment located vertically below the segment having the first starting count number. Referring to FIG. 3, if segment row address number 112 addresses segment 18, segment row address number 116 would address the vertically adjacent segment 20. The first starting count number 118, in this instance, would be the starting count number of segment of segment 18 which is 127, while the second starting count number 120 would be the starting count number of segment 20, which is 67.

Referring again to FIG. 5, difference circuit 122 takes the difference between the first starting count number 118 and the second starting count number 120 to generate a different signal 124. This different signal represents the difference between the starting count numbers of vertically adjacent segments. For example, different signal 124 may represent the difference between the starting count number 127 of segment 18 and the starting count number 67 of segment 20, which is equal to 60. Similarly, difference signal 124 may represent the difference between starting count number 67 of segment 20 and starting count number 37 of segment 22, which is equal to 30.

As shown in FIG. 5, the difference signal 124 is applied to averaging circuit 126. Averaging circuit 126 also receives the count signal 106 from line counter/divider 104, which is representative of the row number within each segment. Averaging circuit 126 generates a gradient signal 128 which is representative of the difference signal multiplied by the row number within the gradient, that is supplied by count signal 106, divided by the total number of rows in each gradient. In other words, gradient signal 128 is a correction factor that is different for each row number within a segment. Averaging circuit 126 also generates a ±signal 130 indicating whether the difference signal 124 is a positive or negative number. Since the difference circuit 122 subtracts the second starting count number 120 from the first starting count number 118, a positive or negative number can be generated as the difference signal 124. Additionally, the starting count numbers can also be positive or negative numbers that are stored in RAM 100 so that the difference signal 124 still indicates whether the gradient is increasing or decreasing by virtue of the sign of the difference signal 124. Hence, sign signal 130 indicates whether the gradient signal 128 is a positive or negative signal. Adder 132, in addition to receiving he gradient signal 128 and sign signal 130, also receives the first starting count number signal 118. The adder functions to add or subtract the gradient signal 128 to or from the first starting count number 118, depending upon the sign of sign signal 130. Adder 132 also produces a sign signal 134 indicating whether the output of adder 132 is a positive or negative number. Adder 132 adds together the first starting count number 118 that is supplied to adder 132 via input 133 and the gradient signal 128. This resultant signal is an 8 bit signal that is divided into two 4 bit signals 136 and 138. Four bit signal 136 constitutes the four least significant bits of the 8 bit signal generated by adder 132, while 4 bit signal 138 constitutes the four most significant bits of the 8 bit signal generated by adder 132. Lookup tables 140 and 142 generate 16 bit signals 144 and 146, respectively. The operation of the lookup tables 140, 142 are disclosed more fully in FIG. 6. The 16 bit signals 144, 146 are applied in parallel to shift registers 148, 150, respectively. Shift registers 148 and 150 receive the 16 bit signals 14, 146 in parallel and shift the data out via serial outputs 152, 154 in a serial fashion at a rate determined by pixel clock 90. The serial data from shift registers 148, 150 is applied to exclusive-or gates 156, 158, respectively. The other input of the exclusive-or gates is the ±signal 134. The ±signal 134 is also applied to the inverted inputs of tri-state gates 160, 162 via inputs 164, 166, respectively. The outputs of exclusive-or gates 156, 158 are applied to the enable inputs 168, 170 of tri-state gates 160, 162. Tri-state gates 160, 162 produce outputs 172, 174, respectively.

In operation, the shift registers 148, 150 generate a serial bit stream having a series of pulses that are 16 bits long that are representative of the correction factors signal that is to be generated for each row of each segment 16. Exclusive-or gates 156, 158 generate an output whenever the input signals are different, and produce no output when the input signals are the same. For example, if an output pulse is produced on serial line 152 and ±input 134 is minus, exclusive-or gate 156 will produce an output pulse on enable line 168 that lasts for the length of the serial bit 152 that is read from shift register 148. The minus signal is also applied via connector 164 to inverted input of tri-state gate 160 and inverted to a positive signal such that a positive output is produced at the output of 172 of tri-state gate 160 for the length of time of the serial bit generated by shift register 148 on line 152. If, however, the ±line 134 were to indicate a plus signal, tri-state gate 160 would not be enabled via enable input 168, as long as an output bit is present on line 152. When shift register 148 generates a zero pulse on line 52, and the ±signal 134 is positive, a pulse is generated on enable input 168 for the length of the zero bit supplied on line 152. The plus signal is inverted on input 164 to tri-state gate 16generated a minus pulse is generated at output 172 for the length of the zero bit generated on line 152.

FIG. 6 illustrates the manner in which the outputs 172, 174 of tri-state gates 160, 162 are processed. As illustrated in FIG. 6, tri-state gate 160 has an inverted input 164 and an enable input 168. Similarly, tri-state gate 162 has an inverted input 166 and an enable input 170. The manner in which outputs 172 and 174 are generated is described above. Outputs 172 and 174 are applied to resistors 176, 178. As described above, the output of tri-state gate 172 is representative of the four least significant bits of the correction signal that is generated by adder 132, while output 174 is representative of the four most significant bits of the correction signal generated by adder 132. To achieve the proper weighting for outputs 172 and 174, resistors 176 and 178 are weighted in the proper manner. For example, resistor 178 can be made sixteen times larger than resistor 176 to properly weight the four most significant bits that are represented by output 174. The outputs 180 and 182 are combined at input 184 to integrator 186. The combined input 184 is compared by integrator 186 with the reference voltage 188 to produce an integrated sloping signal at output 190 as described in the above-referenced patent applications that have been incorporated herein by reference.

Figure 7:
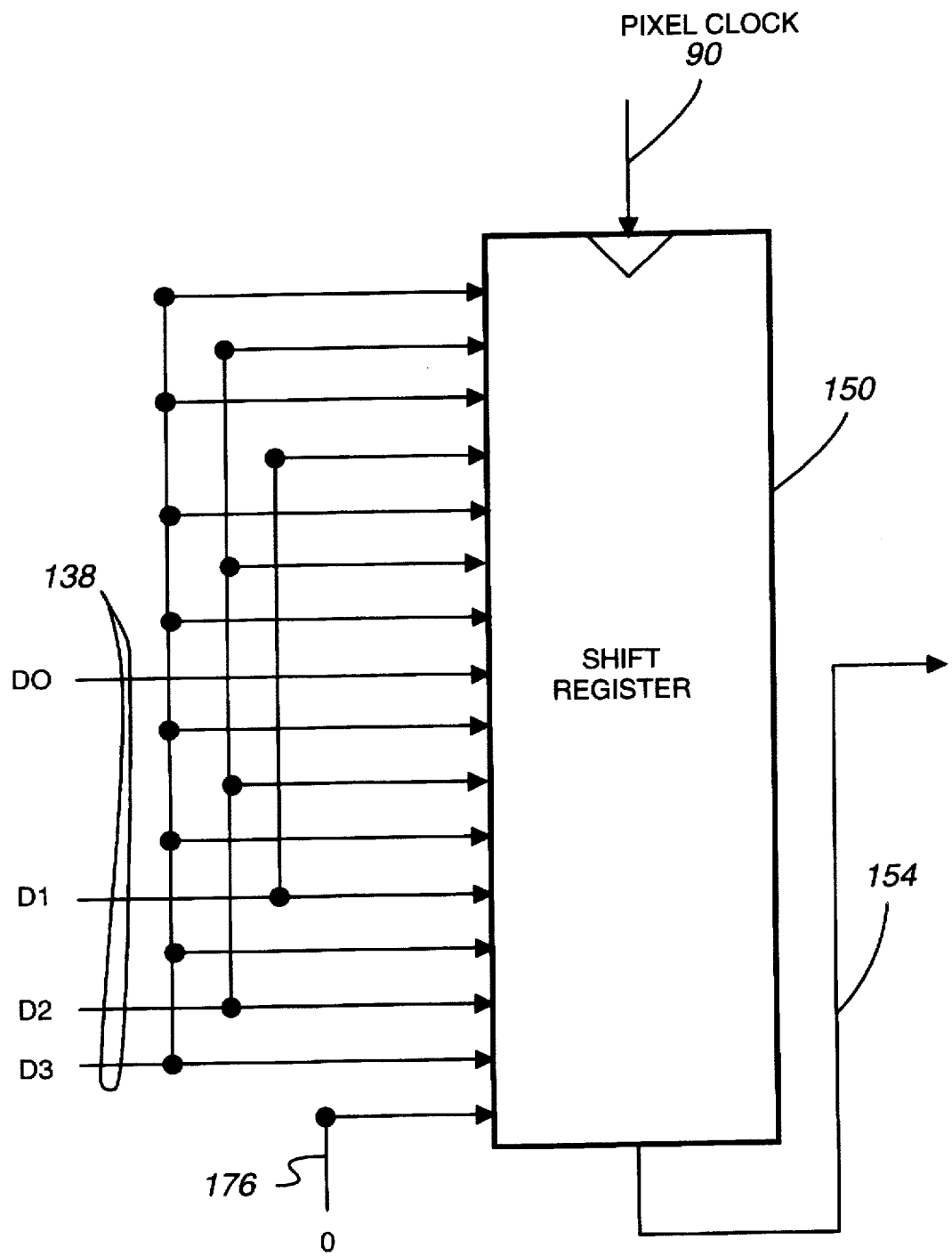
FIG. 7 is a schematic block diagram of the manner in which the look-up table of FIGS. 5A and 5B can be implemented.

FIG. 7 is a schematic illustration of the manner in which a look-up table such as look-up tables 140, 142 (FIG. 5) can be implemented. For purposes of example, shift register 150 is illustrated having a serial output 154. As shown in FIG. 7, the four bit input 138 has four separate bits, D0, D1, D2, D3. A zero input 176 is also shown as an input to register 150 to illustrate a complete 16 bit input to shift register 150. FIG. 7, of course, is an alternative to the look-up tables 140, 142 illustrated in FIG. 5 that can be implemented in ROM to provide a similar 16 bit input to the shift register 150.

FIG. 8 schematically illustrates the 16 bit signal that can be generated by the D0, D1, D2, D3 and zero inputs. As can be seen from FIG. 8, the 16 bits 0-F are evenly distributed in the manner shown in FIG. 7. Combinations of the bits D0-D3 is capable of providing any evenly spaced series of input bits to shift register 150. As illustrated in FIG. 8, the open circles indicate a binary 1 that is stored as a pulse in shift register 150.

The present invention therefore provides a math engine that is capable of generating correction signals that form a gradient between vertically adjacent segments on a cathode ray tube monitor. This can be done by either determining the proper increment rate and storing that information with a plurality of start count signals, or, by calculating the increment rate by determining the difference between the starting count numbers of vertically adjacent segments. By providing a gradient of correction signals, discontinuities in the video that is displayed on the screen are eliminated. The present invention provides a way in which these gradients can be generated in a simple and inexpensive manner using minimal storage to achieve these corrections.

The foregoing description of the invention has been presented for purposes of illustration and description. It is not intended to be exhaustive or to limit the invention to the precise form disclosed, and other modifications and variations may be possible in light of the above teachings. For example, although not illustrated, the gradient of correction signals can be used to generate pulse-width modulation (PWM) signals to perform various types of corrections for various distortions that can be corrected using the apparatus and methods of the present invention. Additionally, such PWM signals do not necessarily need to be integrated to form a smooth output since corrections are provided for each row of pixels. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating a gradient of pulse density modulated correction signals for a video monitor comprising the steps of:

loading a gradient counter with a starting count number for said gradient to be generated;

loading an increment rate counter with an increment rate number;

generating an increment signal from said increment rate counter that has an increment rate corresponding to said increment rate number;

generating said gradient of pulse density modulation correction signals from said gradient counter by applying said increment signal to said gradient counter to increment said starting count number at said increment rate so as to produce a series of output signals having a gradient that changes at a rate corresponding to said increment rate number.

2. A method of generating a pulse density signal for correcting geometries in a video monitor said pulse density signal having predetermined correction numbers that change at a predetermined rate comprising the steps of:

loading a counter with a predetermined starting count number representative of said predetermined correction numbers said pulse density signal;

generating a rate control signal corresponding to said predetermined rate of change of said correction numbers;

applying said rate control signal to said counter to produce said pulse density signal having said predetermined number of starting pulses and said predetermined rate of change.

3. An apparatus that generates a plurality of correction signals in a plurality of segments identified on a video monitor such that said plurality of correction signals form a gradient between vertically adjacent segments comprising;

a memory that stores correction factors and increment rate factors for each of said plurality of segments;

increment rate counters that generate increment rate signals in response to said increment rate factors;

counters loaded with said correction factors that generate said plurality of correction signals in response to said increment rate signals.

4. The apparatus of claim 3 wherein said counters comprise up/down counters that generate said plurality of correction signals in response to said increment rate signals that both increment and decrement said up/down counters.

* * * * *